United States Patent
Pappu et al.

(10) Patent No.: US 8,085,775 B1
(45) Date of Patent: Dec. 27, 2011

(54) IDENTIFYING FLOWS BASED ON BEHAVIOR CHARACTERISTICS AND APPLYING USER-DEFINED ACTIONS

(75) Inventors: Surya K. Pappu, Milpitas, CA (US);
Paul Jezioranski, Raleigh, NC (US);
Sharad R. Murthy, Fremont, CA (US)

(73) Assignee: Sable Networks, Inc., Santa Clara, CA (US)

(*) Notice: Subject to any disclaimer, the term of this patent is extended or adjusted under 35 U.S.C. 154(b) by 467 days.

(21) Appl. No.: 11/497,002

(22) Filed: Jul. 31, 2006

(51) Int. Cl.
*H04L 12/56* (2006.01)
(52) U.S. Cl. ...................................... 370/392
(58) Field of Classification Search .................. 370/229, 370/232–236, 352, 392
See application file for complete search history.

(56) References Cited

U.S. PATENT DOCUMENTS

| | | | |
|---|---|---|---|
| 6,167,041 A | 12/2000 | Afanador | |
| 6,252,848 B1 | 6/2001 | Skirmont | |
| 6,310,881 B1 | 10/2001 | Zikan et al. | |
| 6,314,105 B1 * | 11/2001 | Luong | 370/395.2 |
| 6,934,250 B1 | 8/2005 | Kejriwal et al. | |
| 7,113,990 B2 | 9/2006 | Scifres et al. | |
| 2002/0141339 A1 * | 10/2002 | Konuma | 370/229 |
| 2003/0058874 A1 * | 3/2003 | Sahaya et al. | 370/401 |
| 2003/0118029 A1 * | 6/2003 | Maher et al. | 370/395.21 |
| 2004/0064607 A1 * | 4/2004 | Odakura et al. | 710/57 |
| 2004/0136396 A1 * | 7/2004 | Yonge et al. | 370/445 |
| 2005/0141426 A1 | 6/2005 | Hou | |
| 2005/0226149 A1 | 10/2005 | Jacobson et al. | |
| 2006/0233101 A1 * | 10/2006 | Luft et al. | 370/229 |
| 2007/0133524 A1 * | 6/2007 | Kwon | 370/356 |

* cited by examiner

*Primary Examiner* — Yong Zhou
(74) *Attorney, Agent, or Firm* — West & Associates, A PC; Stuart J. West; Shaun N. Sluman

(57) ABSTRACT

A mechanism is disclosed for identifying, classifying, and controlling flows in a network. In one implementation, a separate set of behavioral statistics is maintained for each flow. These behavioral statistics are updated as packets belonging to a flow are processed. Whenever a packet belonging to a flow is processed, a set of policies that the flow's behavioral statistics satisfy is determined. For each policy that the flow's behavioral statistics satisfy, actions that are associated with that policy are applied relative to the packet. The actions may be designed to cause a router to handle, in a user-specified manner, packets that are likely to represent a particular kind of traffic. Thus, different flows, such as VOIP, gaming, streaming, and P2P flows, which are associated with different behavioral statistics, may be handled in ways applicable for the specific application traffic type.

3 Claims, 4 Drawing Sheets

402
FLOW ID

BEHAVIORAL STATISTICS
- TOTAL (T) BYTE COUNT
- LIFE (L) DURATION SINCE INCEPTION
- RATE (R) OF INFORMATION FLOW
- NUMBER (N) OF PACKETS PROCESSED
- AVERAGE (A) PACKET SIZE
- AVERAGE PACKET RATE
- AVERAGE INTER-PACKET GAP
- MOVING AVERAGE FLOW RATE
- INSTANTANEOUS FLOW RATE
- TIMESTAMP
- OTHER

OTHER FLOW INFORMATION

FIG. 4

IDENTIFYING FLOWS BASED ON BEHAVIOR CHARACTERISTICS AND APPLYING USER-DEFINED ACTIONS

CROSS-REFERENCE TO RELATED APPLICATIONS

The present application is related to U.S. patent application Ser. No. 11/022,599, which is incorporated by reference herein.

BACKGROUND

Voice Over IP (VOIP) services represent a great opportunity for service providers who expect to increase the profitability of their Internet Protocol (IP) networks. At the same time, new VOIP overlay providers are emerging, offering "rogue" or non-service provider VOIP services which hamper various efforts to deliver competitive VOIP services.

These small, agile overlay providers have direct relationships with service provider customers and are freely using existing network infrastructures to steal profits by delivering VOIP services at very low costs.

Through the identification, reporting, and control of subscribers using rogue VOIP, service providers would like to have an opportunity to re-claim lost customers. Service providers view this as being important as service providers grow their VOIP offerings and look to VOIP as the foundation for IP network profitability.

In addition to re-claiming revenues from existing subscribers, service providers can introduce a new Premium Peering model where overlay providers pay justified rates, allowing the service provider to maintain a value-added position in the service delivery chain. Overlay providers now use provider networks in a Fair-Use manner. This expands the overall income potential of VOIP. The service provider makes money. The overlay provider gets a guaranteed service.

Identification and control of rogue VOIP (such as SKYPE) is challenging since VOIP traffic represents only a small percentage of overall Internet traffic. To do some kinds of complicated inspection (e.g., payload inspection) on all packets—when such inspection is not needed for the majority of the traffic—would be expensive. At rates above 1 Gbps, some kinds of complicated inspection are often not possible. With VOIP currently representing less than 1% of Internet traffic, attempting to identify packets that represent VOIP traffic truly can be like attempting to find a needle in a haystack. Additionally, rogue VOIP applications often mask ports (e.g., Transport Control Protocol (TCP) ports) and encrypt packet payload contents, making it very difficult or impossible for routers or deep packet inspection equipment to detect, much less control, rogue VOIP traffic.

While VOIP traffic represents one end of the Internet traffic spectrum, several file sharing applications such as KaZaA, Gnutella, BearShare, and Winny represent the other end. The amount of peer-to-peer (P2P) traffic on the Internet has grown immensely in recent years. In fact, it has been estimated that P2P traffic now represents about 50-70 percent of the total traffic on the Internet. This is so despite the fact that the number of P2P users is quite small compared to the number of non P2P users. Thus, it appears that most of the bandwidth on the Internet is being consumed by just a minority of the users. For this and other reasons, P2P traffic is viewed by ISPs (Internet service providers) and others as being abusive/misbehaving traffic that should be controlled and penalized.

In order to control P2P traffic, however, it first needs to be identified. Earlier generations of P2P protocols used fixed TCP port numbers for their transmissions. For example, Fast-Track used TCP port 1214. This made P2P traffic easy to identify. Current P2P protocols, however, no longer have to use fixed port numbers. Rather, they can be configured to use random dynamic port numbers so that P2P traffic can now be masqueraded as other types of traffic, such as HTTP web browsing and unspecified TCP traffic. As a result, the current P2P protocols have rendered the port-based identification techniques ineffective.

Another technique that has been used to identify P2P traffic involves the use of signatures. Specifically, it was observed that some P2P protocols inserted distinct information into their data packets. Using this distinct information as a signature, it was possible to identify packets that were assembled using those P2P protocols. This technique has several problems. First, it usually is effective for only a relatively short period of time. As the P2P protocols evolve and mutate (which they do on a fairly constant basis), their signatures change. Once that happens, the previous signatures are no longer valid, and the technique will have to be changed to recognize the new signatures. Another and more serious problem is that the P2P protocols are now evolving to the point that they either leave no signature or they obfuscate their signatures (e.g. by encryption). This makes it extremely difficult, if not impossible, to identify P2P traffic using signatures.

Overall, P2P protocols have gotten quite sophisticated, and the more sophisticated they become, the more difficult it is to identify P2P traffic. Unless P2P traffic can be identified, it cannot be effectively controlled.

SUMMARY

In accordance with one embodiment of the present invention, a mechanism for effectively identifying, classifying, and controlling information packet flows in a network is provided. This mechanism may be applied to any type of network traffic that cannot otherwise be statically classified, including, but certainly not limited to, P2P traffic, online gaming traffic, and VOIP traffic. In one embodiment of the invention, flows are identified and classified based upon their observed behavior. Because flows are identified and classified based upon their observed behavior, and because their behavior cannot be hidden, the traffic type that a flow represents can be estimated with relatively high accuracy even if the contents of the packets that represent the traffic type are dissimilar. Thus, regardless of how applications attempt to conceal (e.g., by using encryption) the type of traffic represented by packets that originate from those applications, the traffic types that flows represent can be estimated with high accuracy, and packets that belong to those flows can be handled in a desired manner appropriate to those traffic types.

In one embodiment of the invention, a flow is processed as follows. One or more information packets belonging to the flow are received and processed. As the information packets are processed, a set of behavioral statistics are maintained for the flow. These behavioral statistics reflect the empirical behavior of the flow. In one embodiment, the behavioral statistics include a total byte count (sum of all of the bytes in all of the packets of the flow that have been processed up to the current time), a life duration (how long the flow has been in existence since inception), a flow rate (derived by dividing the total byte count by the life duration of the flow), and an average packet size (derived by dividing the total byte count by the total number of packets in the flow that have been processed and forwarded). These behavioral statistics are updated as information packets belonging to the flow are processed; thus, these statistics provide a current reflection of the flow's behavior.

In one embodiment of the invention, whenever a packet belonging to the flow is processed, a set of zero or more user-specified policies (within a set of user-specified policies) that the flow's behavioral statistics satisfy is determined. For each policy that the flow's behavioral statistics satisfy, one or more user-specified actions that are associated with that policy are applied relative to the packet. The actions may be designed to cause a router to handle, in a user-specified manner, packets that are likely to represent a particular kind of traffic. For example, actions may include penalizing or rewarding a particular flow by changing that flow's "drop priority," changing a particular flow's "flow type," changing an "aggregate class" to which a particular flow belongs, rerouting packets that belong to a particular flow, mirroring packets that belong to a particular flow, capturing and/or logging information about packets that belong to a particular flow, and other actions that are described in greater detail below.

Thus, different flows that are associated with similar behavioral statistics may be handled in similar ways. For example, multiple flows that exhibit behaviors that are characteristic of P2P traffic all may be handled in one way that is appropriate for P2P traffic. Multiple flows that exhibit characteristics of VOIP traffic all may be handled in another way that is appropriate for VOIP traffic. Multiple flows that exhibit characteristics of online gaming traffic all may be handled in yet another way that is appropriate for online gaming traffic.

BRIEF DESCRIPTION OF THE DRAWINGS

FIG. 4 is a diagram of a sample flow block in accordance with one embodiment of the present invention.

DETAILED DESCRIPTION OF EMBODIMENT(S)

Network Overview

Figure 1:
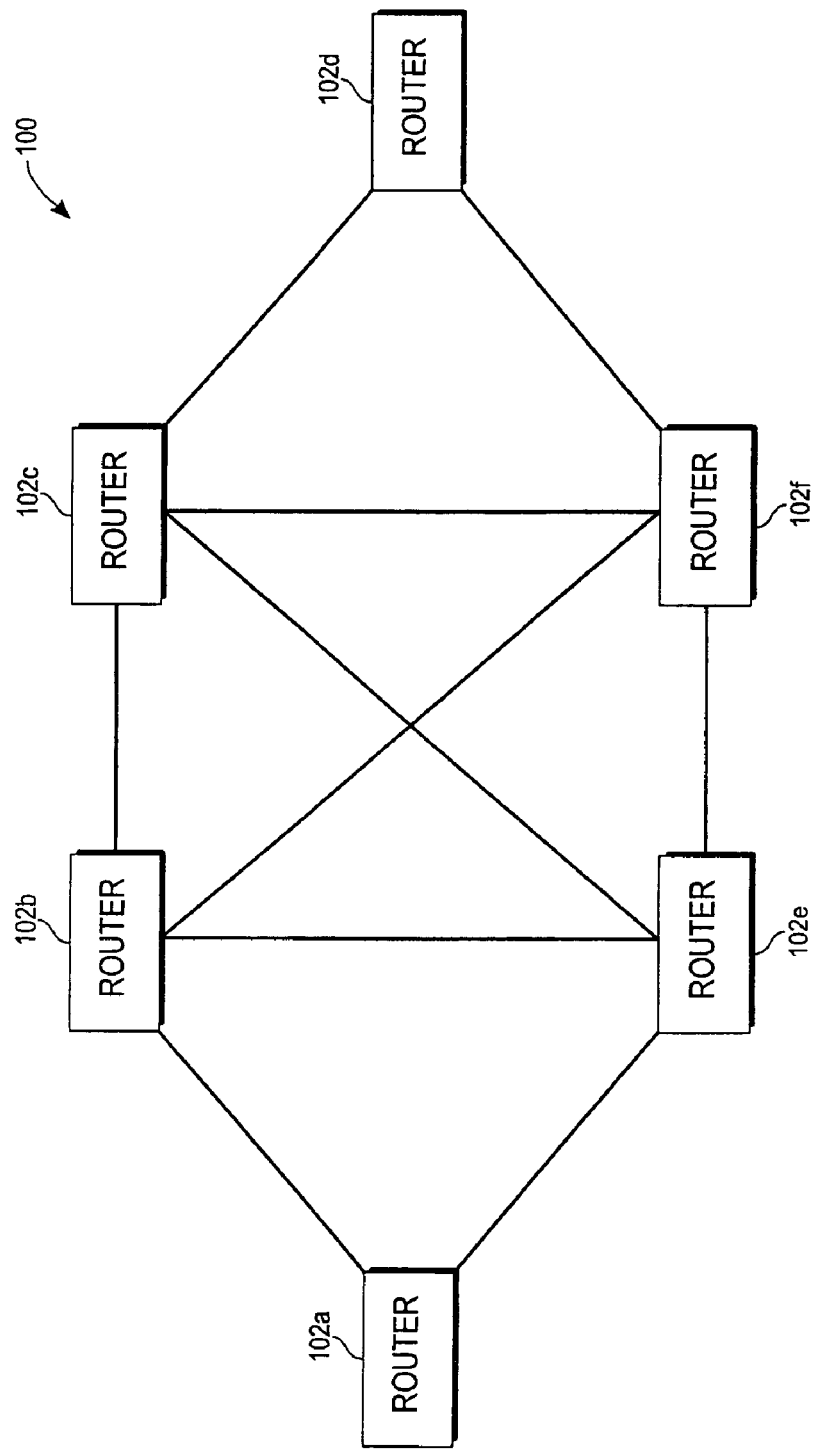
FIG. 1 shows an overview of a network in which one embodiment of the present invention may be implemented.

FIG. 1 shows an overview of a network 100 in which one embodiment of the invention may be implemented. As shown, network 100 comprises a plurality of routers 102 interconnected to each other by trunks or links in such a way that each router 102 has multiple possible paths to every other router 102. For example, information from router 102a may reach router 102d by going through routers 102b and 102c, or routers 102e and 102f, and information from router 102c may reach router 102a by going through router 102b or router 102e. Interconnecting routers 102 in this way provides flexibility in determining how information from one router 102 is delivered to another, and makes it possible to route around any failures that might arise. For the sake of simplicity, only a few routers 102 are shown in FIG. 1; however, it should be noted that network 100 may be much more complex if so desired, comprising more routers 102, more connections between routers 102, and other components.

In addition to being coupled to each other, each router 102 may further be coupled to various machines (not shown), such as clients and servers, from which information originates and to which information is destined. By going through routers 102, each of these machines may send information to any of the other machines in network 100.

Information is conveyed from one router 102 to another via a physical link or trunk. Depending on the type of network, this link or trunk may be an optical medium (e.g. an optical fiber), a coaxial cable, or some other type of medium. Network 100 may use any type of transport medium. Although embodiments of the invention are discussed below in the context of routers, embodiments of the invention also may be implemented within other types of network elements such as hubs, switches, load balancers, gateways, firewalls, etc.

In one embodiment of the invention, links between routers 102 (which links may be referred to as "trunks") are very high speed links that can transport data at speeds as fast as 10 gigabits per second—or even faster. Because techniques described herein are capable of analyzing and classifying packets and flows very quickly, these techniques are especially useful in routers that connect to such very high-speed links. Because techniques described herein can be used to analyze and classify packets and flows quickly, these techniques can be used without slowing down the rate at which packets flow through the network, unlike some other approaches.

Router Overview

Figure 2:
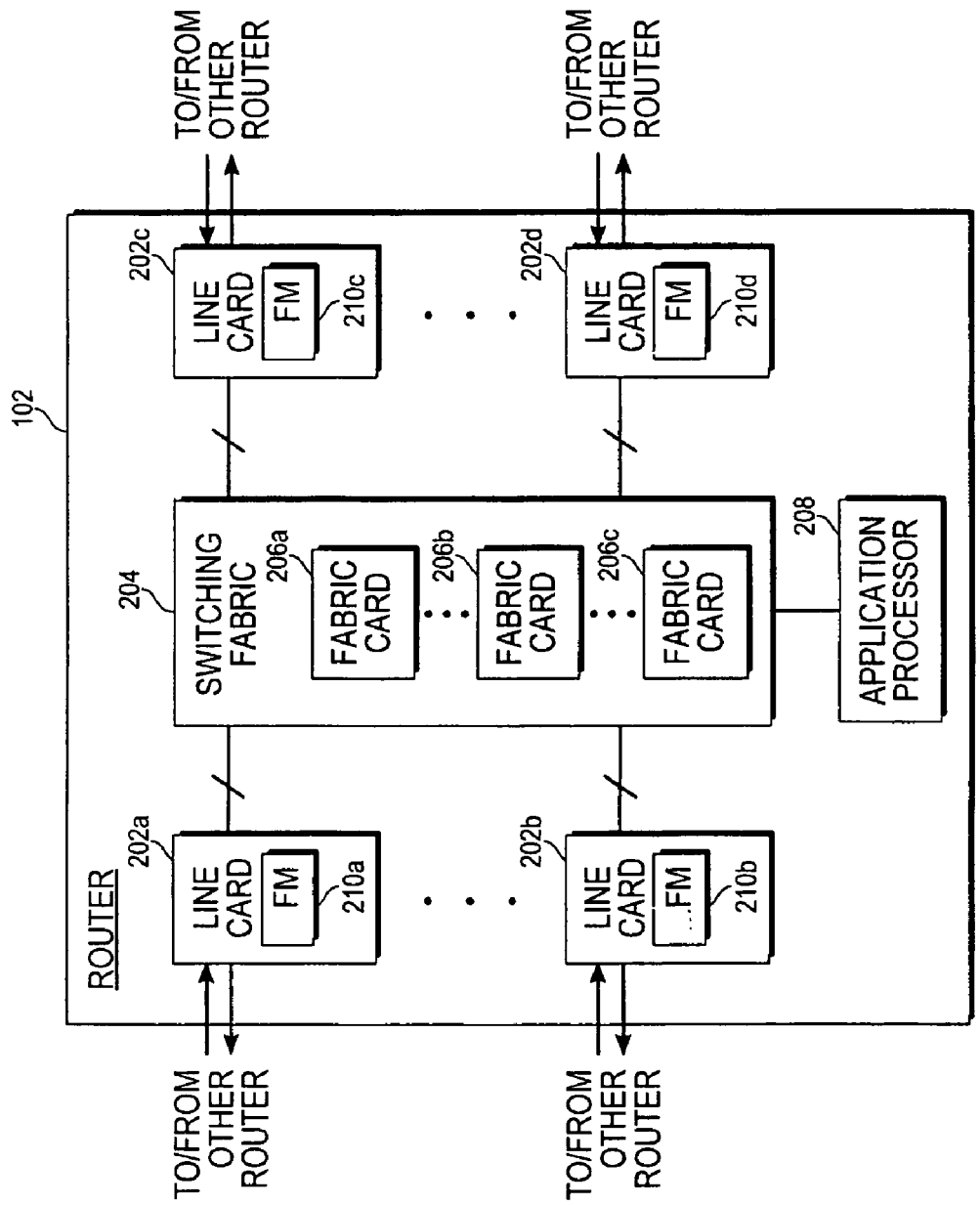
FIG. 2 is a block diagram of a router in which one embodiment of the present invention may be implemented.

FIG. 2 shows a block diagram of a sample router 102 that may be used to implement one or more of routers 102 in network 100. As shown in FIG. 2, router 102 comprises a plurality of line cards 202 for coupling router 102 to one or more other routers 102 in the network 100. For example, assuming that router 102 in FIG. 2 is router 102b in network 100, line card 202d may couple router 102b to router 102f, line card 202c may couple router 102b to router 102c, line card 202b may couple router 102b to router 102e, and line card 202a may couple router 102b to router 102a. Overall, line cards 202 act as router's 102 interfaces to the rest of network 100. In one embodiment of the invention, the trunks coupled to the line cards 202 are bi-directional; thus, each line card 202 may receive information from another router, or send information to another router. Put another way, each line card 202 is capable of acting as an ingress line card (to receive information from another router) or an egress line card (to send information to another router). Whether a particular line card 202 is acting as an ingress or an egress line card at any particular time depends upon the flow of network traffic.

To couple line cards 202 to each other within router 102, an internal switching fabric 204 is provided. In one embodiment of the invention, switching fabric 204 comprises a plurality of interconnected fabric cards 206. Basically, switching fabric 204 provides a mechanism for coupling any line card 202 to any other line card 202 within router 102 so that information can be transported from any ingress line card 202 to any egress line card 202. By transporting information from an ingress line card 202 to an egress line card 202, switching fabric 204 routes information through router 102 and sends it on its way to the next hop (i.e. the next router). Information is thus received and routed by router 102.

In one embodiment of the invention, to increase the flexibility of router 102 and to facilitate the process of failure recovery, each line card 202, has multiple connections to switching fabric 204. In addition, switching fabric 204 provides multiple routes for connecting each line card connection to every other line card connection. With such a setup, each line card 202 has multiple routes to every other line card 202 in router 102. For example, one possible route from line card 202d to line card 202a may pass through fabric card 206c, while another route may pass through fabric card 206b. By providing multiple routes between various line cards 202, switching fabric 204 makes it possible to route around any internal failures that may arise.

In addition to line cards 202 and switching fabric 204, router 102 further comprises an application processor 208. In one embodiment, application processor 208 determines the forwarding paths, and hence, the egress line cards, that can be used to forward information to any particular destination address. Put another way, given a destination address, application processor 208 determines which line card 202 or line cards are most suitable to act as the egress line card to forward information to that destination address. For example, router 102 in FIG. 2 might be router 102b in network 100, and the destination might be a machine coupled to router 102d. Additionally, line card 202c might be coupled to router 102c and line card 202d might be coupled to router 102f. In such a case, because the most direct routes to router 102d would be through either router 102c or 102f, the most suitable egress line cards for forwarding information to destination router 102d probably would be line cards 202c and 202d. Accordingly, application processor 208 would designate these line cards 202c and 202d as potential egress line cards for destination router 102d, with one being designated as the primary egress line card and the other being the alternate.

Once the egress line card determinations are made by application processor 208 for each destination address, the determinations are communicated to each of line cards 202 in router 102. In turn, each line card 202 stores the information into a forwarding table residing on that line card 202. Thereafter, when a line card 202 acts as an ingress line card and receives a set of information, that line card 202 can use the forwarding table to determine the appropriate egress line card 202 to which to forward the information. Because the egress line card information is predetermined and stored in the forwarding table, the ingress line card simply has to perform a table lookup to determine the proper egress line card. No on-the-fly calculation needs to be performed. Since table lookup operations can be carried out very quickly, the process of determining the proper egress line card requires relatively little time.

Information Routing

In one embodiment, information is routed from router to router and from line card 202 to line card 202, in the form of information packets. Each packet represents a set of information that is sent by a source to a destination. To enable a packet to be properly routed, that packet typically comprises a header portion. The header portion contains information that is used by line cards 202 to determine the next hop for the packet. Depending upon the protocols used, the information contained in the header portion may differ. In one embodiment, the header portion comprises the following sets of information: (1) a source address (i.e., the network address (e.g., Internet Protocol (IP) address) of the entity sending the packet); (2) a source port number (e.g., a Transport Control Protocol (TCP) or User Datagram Protocol (UDP) port number); (3) a destination address (i.e., the network address (e.g., IP address) of the entity that is to receive the packet); (4) a destination port number (e.g., a TCP or UDP port number); and (5) an indication of the transport layer protocol (e.g., TCP or UDP) that is to be used. These sets of information may be referred to as the "five tuple". Using this header information, an ingress line card 202 can determine to which egress line card 202 the packet should be routed.

In addition to the header portion, a packet also comprises a payload. The payload comprises the actual data that the source is trying to send to the destination. In addition to the actual data, the payload may also include other information, such as information inserted by other protocols (e.g., P2P protocols). This additional information may be needed by the destination to properly process the packet. The payload may be encrypted by the source or an intermediate router so that only a destination router or a destination end station can decrypt and understand the payload.

In one embodiment of the invention, one or more packets are grouped into a flow. Multiple different flows, each comprising different packets, may exist concurrently. According to one embodiment of the invention, a flow is a set of packets that are related in some manner. In one embodiment of the invention, packets are grouped into a flow if those packets share a sufficient amount of header information. More specifically, in one embodiment of the invention, packets are deemed to belong to the same flow if they have the five tuple in common. Thus, if two or more packets have the same source address, the same source port number, the same destination address, the same destination port number, and the same transport layer protocol, then those packets are deemed to belong to the same flow. Usually, barring some failure that requires rerouting, all of the packets belonging to a flow are received by the same ingress line card 202 and forwarded to the same egress line card 202. By grouping packets into flows, it is possible to aggregate individual packets in a meaningful way to allow the traffic flowing through router 102 to be understood at a higher level.

The flows that pass through router 102 may represent many different types of traffic. For example, the flows may represent web browsing traffic, P2P traffic, Voice Over IP (VOIP) traffic, File Transfer Protocol (FTP) traffic, Hypertext Transfer Protocol (HTTP) traffic, gaming traffic, video traffic, etc. To make the best use of available resources, and to best control the traffic that passes through router 102, router 102 would benefit from an ability to identify different types of traffic, and to take specified appropriate actions relative to those types of traffic. In one embodiment of the invention, line cards 202 of router 102 are enhanced to give router 102 such ability. More specifically, in one embodiment of the invention, line cards 202 are adapted to include a flow manager (FM) 210 for keeping track of flows, determining what behaviors those flows are exhibiting, and applying user-specified actions to those flows based on those flows' exhibited behaviors.

FM 210 of line cards 202 may be implemented in any desired manner. For example, the functionality of FM 210 may be realized by having one or more network processors on a line card 202 execute one or more sets of instructions. Alternatively, FM 210 may be implemented using hardwired logic components (e.g., in the form of one or more ASICs on a line card 202). These and other implementations are within the scope of the present invention.

Operational Overview of FM on Line Card

Figure 3:
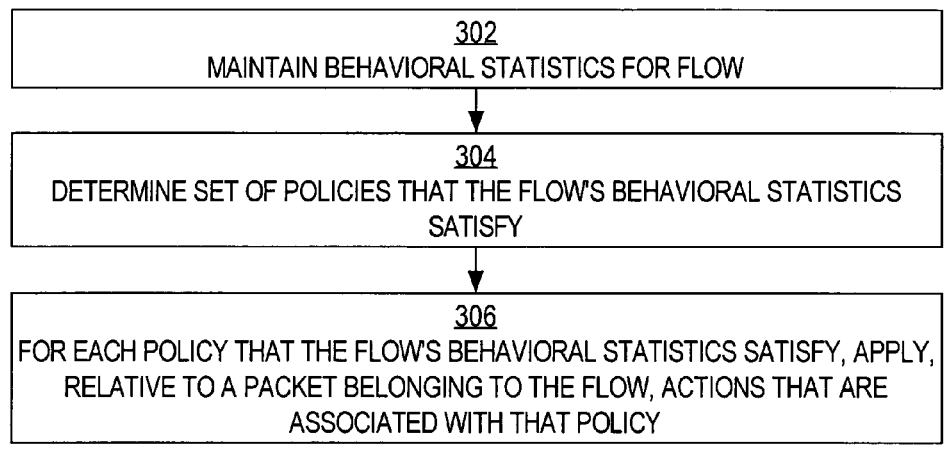
FIG. 3 is an operational flow diagram showing the operation of a flow manager (FM) in accordance with one embodiment of the present invention.

An overview of an operational example of FM 210 is described below with reference to FIGS. 2 and 3. In the following discussion, FM 210 is assumed to be on a line card that is acting as an egress line card (i.e. the line card is receiving packets from an ingress line card and sending packets out to another router). However, FM 210 may process flows in the same manner even when the line card is acting as an ingress line card (i.e. the line card is receiving packets from another router and sending them to an egress line card).

Initially, FM 210 receives and processes one or more packets belonging to a flow. FM 210 may establish a new flow whenever FM 210 receives and processes a packet that does not match any previously established flow (e.g., based on that packet's header information). As is described in greater detail below, in one embodiment of the invention, when FM 210 receives a packet, FM 210 determines whether that packet matches any existing "flow block" data structure. If the packet matches an existing flow block, then the packet is deemed to belong to the flow that corresponds to that flow block. Alternatively, if the packet does not match an existing flow block, then FM 210 creates a new flow block for a new flow to which the packet is deemed to belong. When FM 210 creates a new flow block, FM 210 stores, in that flow block, criteria (e.g., a "five tuple") that information in a packet (e.g., header information) needs to satisfy in order to be deemed to belong to that flow. Processing a packet may, but does not necessarily, involve forwarding the packet to another router. As the packets of a flow are processed, a set of behavioral statistics are maintained (block 302 of FIG. 3) for the flow. These behavioral statistics reflect the empirical behavior of the flow. In one embodiment of the invention, FM 210 stores information about a flow's behavioral statistics in the flow block for that flow.

In one embodiment of the invention, the behavioral statistics include a total byte count (sum of all of the bytes in all of the packets of the flow that have been processed up to the current time), a life duration (how long the flow has been in existence since inception), a flow rate (derived by dividing the total byte count of the flow by the life duration of the flow), and an average packet size (derived by dividing the total byte count of the flow by the total number of packets in the flow that have been processed). In one embodiment of the invention, the behavioral statistics include an average packet rate (derived by dividing (a) the total number of packets in the flow that have been processed by (b) the life duration of the flow), an average inter-packet gap (derived by averaging the amounts of time that pass between the arrivals of packets that belong to the flow), an instantaneous flow rate (referred to as $R_{instant}$ and derived by dividing (a) the size of the most recently processed packet of the flow by (b) the inter packet arrival time gap between the two most recently received packets of this flow), and a moving average flow rate (derived based on the instantaneous flow rate such that the moving average flow rate at time t+1 ($R_{t+t}$) is calculated by the formula $(1-\alpha)*R_t+\alpha*R_{instant}$, where $\alpha$ is some weight such as $\frac{1}{2^x}$ for some x). These behavioral statistics are stored by line card 202 in a flow block associated with the flow, and are updated as information packets belonging to the flow are processed; thus, at any given moment, these behavioral statistics provide a current reflection of the flow's behavior.

In one embodiment of the invention, whenever a packet belonging to the flow is processed, FM 210 determines (block 304) a set of zero or more user-specified policies (within a set of user-specified policies) that the flow's behavioral statistics satisfy. Policies are described in further detail below.

For each policy that the flow's behavioral statistics satisfy, FM 210 applies (block 306), relative to the packet, one or more user-specified actions that are associated with that policy. Examples of some of the actions that FM 210 may apply relative to a packet are described in further detail below. The actions may be designed to cause router 102 to handle, in a user-specified manner, packets that are likely to represent a particular kind of traffic.

Thus, different flows may be handled in different ways. At the same time, different flows that are associated with similar behavioral statistics may be handled in similar ways. Thus, multiple different flows which actually comprise the same kind of traffic may be handled in the same way. For example, two separate flows that both exhibit behavioral statistics that satisfy a first policy may be handled in a first manner (described by the actions associated with the first policy), while two other separate flows that both exhibit behavioral statistics that satisfy a second policy may be handled in a second manner (described by the actions associated with the second policy). Thus, for example, multiple flows that exhibit behaviors that are characteristic of P2P traffic all may be handled in one way, while multiple flows that exhibit characteristics of VON' traffic all may be handled in another way. Although a packet's five tuple may determine the flow to which that packet belongs, the packet's five tuple alone does not necessarily determine which actions router 102 will apply to that packet. This is because the five tuple lacks the information that categorizes the traffic as being P2P, VOIP, online gaming traffic, or another kind of traffic; the five tuple lacks this information primarily because of the often random nature of transport layer port numbers that are present in five tuples of packets that belong to such flows.

The type of traffic that a particular flow represents can be estimated from that flow's behavioral statistics. Therefore, even if two packets have different five tuples and therefore belong to different flows despite the fact that both of those packets represent the same type of traffic (e.g., P2P, VOIP, etc.), techniques described herein enable routers to handle both of those packets in a similar, consistent, and uniform manner. Routers which employ the techniques described herein may classify and handle packets in a manner that takes into account information beyond that which is contained in the packets themselves (some kinds of traffic cannot be identified only on the basis of the information contained in the packets that form that traffic).

Policies

As is discussed above with reference to block 304 of FIG. 3, in one embodiment of the invention, FM 210 determines which of potentially several different policies a particular flow's behavioral statistics satisfy. In one embodiment of the invention, a user programs router 102 with one or more user-specified policies. For example, a user might program router 102 with a set of policies by (a) creating a text file that specifies those policies in a mariner that conforms to a particular syntax or notation that router 102 understands and then (b) storing that text file with a particular name or in a particular location that router 102 expects. Different routers in network 100 may be programmed with different policies.

In one embodiment of the invention, each policy comprises a set of one or more user-specified criteria. The criteria may involve conditions which may or may not be satisfied by a given flow's behavioral statistics. The conditions may be specified in terms of whether a particular behavioral statistic is greater than, less than, or equal to a specified threshold, value, or parameter. A condition may comprise two or more other conditions that are related to each other by some logical operator such as "AND" and/or "OR." Conditions may be formulated in such a way that the behavioral statistics of flows that represent a particular type of traffic tend to satisfy those conditions, while the behavioral statistics of flows that do not comprise that particular type of traffic tend not to satisfy those conditions.

For example, a particular policy might comprise a set of criteria that a flow satisfies only if (a) the flow's total byte count is greater than a first threshold value, (b) the flow's total byte count is less than a second threshold value, (c) the flow's life duration is either less than a third threshold value or greater than a fourth threshold value, (d) either the flow's average flow rate over the last ten seconds is greater than a fifth threshold value or the flow's average packet size is less than a sixth threshold value, (e) the flow's average packet rate is greater than a seventh threshold value, (f) the flow's average packet rate is less than an eighth specified threshold value, and (g) the flow's average inter-packet gap is either less than a ninth specified threshold value or greater than a tenth specified threshold value. Other policies might comprise sets of criteria that are simpler or more complex than the example given.

A policy may be defined in a manner such that flows tend to satisfy (by their behavioral statistics) that policy's criteria if those flows represent a particular kind of traffic (e.g., P2P, VOIP, gaming, etc.), but flows tend to not satisfy that policy's criteria if those flows do not represent the particular kind of traffic. For example, a policy may be defined in a manner such that flows which represent VOIP traffic tend to satisfy (by their behavioral statistics) the policy's criteria, but flows which do not represent VOIP traffic tend to not satisfy the policy's criteria.

In one embodiment of the invention, a VOIP policy, which specifies criteria that flows representing VOIP traffic tend to satisfy, but flows representing non-VOIP traffic tend to not satisfy, is defined. In one embodiment of the invention, the VOIP policy contains the following criteria: the flow's life duration needs to be at least as great as a first, relatively high threshold value, the flow's average bit rate needs to be no greater than a second threshold value, and the flow's packet size needs to be no greater than a third threshold value. Flows which have a relatively long life duration, a relatively low to moderate average bit rate, and a relatively small to medium packet size tend to satisfy these criteria. In one embodiment of the invention, the VOIP policy that is applied to UDP flows, to determine whether those UDP flows represent VOIP traffic, contains the following criteria: the flow's average bit rate needs to be lower than 100 Kbps, the flow's life duration needs to be greater than 10 seconds, and the flow's average packet size needs to be less than 230 bytes. Flows that satisfy these criteria may be identified as flows that represent VOIP traffic, and actions appropriate to VOIP traffic may be applied to these flows.

In one embodiment of the invention, a P2P policy, which specifies criteria that flows representing P2P traffic tend to satisfy, but flows representing non-P2P traffic tend to not satisfy, is defined. In one embodiment of the invention, the P2P policy contains the following criteria: the flow's life duration needs to be at least as great as a first threshold value, the flow's average bit rate needs to be at least as great as a second threshold value, and the flow's packet size needs to be at least as great as a third threshold value. Flows which have a relatively long life duration, a relatively high average bit rate, and a relatively large packet size tend to satisfy these criteria. In one embodiment of the invention, the P2P policy that is applied to TCP flows, to determine whether those TCP flows represent P2P traffic, contains the following criteria: the flow's average bit rate needs to be greater than 32 Kbps (this threshold could be higher if the number of flows going thru the router is low), the flow's life duration needs to be greater than 10 seconds, and the flow's average packet size needs to be greater than 1000 bytes. Flows that satisfy these criteria may be identified as flows that represent P2P traffic, and actions appropriate to P2P traffic may be applied to these flows.

In one embodiment of the invention, an online gaming policy, which specifies criteria that flows representing online gaming traffic tend to satisfy, but flows representing non-online gaming traffic tend to not satisfy, is defined. In one embodiment of the invention, the online gaming policy contains the following criteria: the flow's life duration needs to be at least as great as a first threshold value, the flow's average bit rate needs to be no greater than a second threshold value, the flow's packet size needs to be at least as great as a third threshold value, and the flow's packet size needs to be no greater than a fourth threshold value. Flows which have a relatively long life duration, a relatively low average bit rate, and a relatively medium-sized packet size tend to satisfy these criteria. In one embodiment of the invention, the online gaming policy that is applied to UDP flows, to determine whether those UDP flows represent online gaming traffic, contains the following criteria: the flow's average bit rate needs to be both greater than 8 Kbps and less than 32 Kbps, the flow's life duration needs to be greater than 10 seconds, and the flow's average packet size needs to be greater than 100 bytes and less than 500 bytes. Flows that satisfy these criteria may be identified as flows that represent online gaming traffic, and actions appropriate to online gaming traffic may be applied to these flows.

Typically, VOIP and online gaming use UDP. These kinds of traffic can be differentiated by the range of average bit rate and average packet size used. The average packet size range for online gaming traffic could be different based on whether the traffic is flowing from a client to a server or from a server to a client. The description above is only one of many possible different examples of criteria that may be used to identify traffic of the kinds discussed above.

Other policies may be defined specifically for flows that represent control-type traffic (e.g., DNS, SNMP, and NTP traffic), web surfing traffic (e.g., HTTP and HTTPS traffic), streaming media traffic (e.g., Real Audio traffic), file transfer traffic (e.g., FTP traffic), video traffic (e.g., MPEG-2 traffic), and denial of service traffic. Each policy may be associated with different criteria related to one or more of the behavioral statistics discussed above.

More than one flow might satisfy a particular policy. The fact that multiple flows satisfy the same policy tends to indicate that those flows represent the same type of traffic. Additionally, a particular flow might satisfy multiple policies. After a set of policies that a particular flow satisfies has been determined, then user-specified actions that are associated with policies in that set may be applied to packets that belong to the particular flow as those packets are processed.

Actions

As is discussed above with reference to block 306 of FIG. 3, in one embodiment of the invention, for each policy that a flow's behavioral statistics satisfy, FM 210 applies, relative to a packet that belongs to that flow, one or more user-specified actions that are associated with that policy. In one embodiment of the invention, a user programs router 102 with one or more user-specified associations or mappings between policies and sets of actions. For example, a user might program router 102 with a set of policy-to-action set mappings by (a) creating a text file that specifies those mappings in a manner that conforms to a particular syntax or notation that router 102 understands and then (b) storing that text file with a particular name or in a particular location that router 102 expects. For example, the text file that defines the policies also may specify mappings between those policies and sets of one or more actions. Different routers in network 100 may be programmed with different policy-to-action set mappings.

Various actions may be associated with a particular policy. For example, a policy might be associated with an action that causes the quality of service (QOS) with a packet's flow to be changed. For another example, a policy might be associated with an action that causes a "drop priority" associated with a packet's flow to be increased or decreased. For another example, a policy might be associated with an action that causes a "flow type" associated with a packet's flow to be changed. For another example, a policy might be associated with an action that changes the "aggregate class" to which the packet's flow belongs. QOS-related actions are discussed in greater detail below.

For another example, a policy might be associated with an action that causes information about packets that are associated with a flow to be written or otherwise preserved in a log for later analysis by humans or automated processes.

For another example, a policy might be associated with an action that causes the contents of a packet to be altered in a specified manner. More specifically, a policy might be associated with an action that causes the contents of a "diffusely code point" (DSCP) field of a packet's IP header to be modified (A part of the Type of Service (TOS) field is renamed as the DSCP field in the IP header that routers and other network elements may use to determine the priority and/or the quality of service that the containing packet should be given).

For another example, a policy might be associated with an action that causes a packet to be forwarded through a different egress line card than the egress line card through which that packet otherwise would have been forwarded, thereby causing that packet to take a different route through network 100. For another example, a policy might be associated with an action that causes a copy of a packet to be created and forwarded through a different egress interface than the egress interface through which the original packet is forwarded, thereby causing the copy to take a different route than the original takes through network 100. Such a "mirroring" action may be used to forward the copy through a network path that is known to contain a device that will more thoroughly analyze the copy and possibly drop (i.e., not forward) the copy after analysis is complete, for example.

For another example, a policy might be associated with an action that causes a packet to be dropped. Such an action may be useful for responding to a suspected denial of service attack; all packets that are associated with a flow that exhibits statistical behavior that is characteristic of a denial of service attack may be dropped instead of forwarded, thus preserving the router's processing resources as well as the bandwidth of the network, and thereby thwarting the attack.

A particular policy may be associated with a single one or multiple ones of the actions described above. Under circumstances in which a policy is associated with multiple actions, multiple actions are applied relative to packets that belong to flows that satisfy that policy.

Quality of Service

As is discussed above, a policy may be associated with an action that causes the QOS associated with a flow to change. In one embodiment of the invention, each flow is associated with a separate QOS. For example, for each flow, router 102 may maintain that flow's QOS in a flow block for that flow. A flow's QOS generally indicates, to router 102, how router 102 should buffer and forward packets belonging to that flow relative to how router 102 buffers and forwards packets belonging to other flows. In one embodiment of the invention, a flow's QOS includes a "flow type." In one embodiment of the invention, a flow's QOS includes a "drop priority." Flow type and drop priority are discussed in greater detail below.

In one embodiment of the invention, a flow may be associated with one of four different flow types. A first flow type is the "high priority" flow type. When a flow is associated with this flow type, router 102 buffers and forwards that flow's packets in a manner such that the flow's packets are forwarded before the packets of any other flow that is not also associated with that flow type.

A second flow type is the "constant rate limit" flow type. Flows associated with this flow type are also associated with a bandwidth. When a flow is associated with this flow type, router 102 buffers and forwards that flow's packets in a manner such that the flow's packets will travel through network 100 at no less than, but also no more than, the associated bandwidth—to the extent that router 102 can assist this to happen.

A third flow type is the "minimum rate" flow type. Flows associated with this flow type are also associated with a bandwidth. When a flow is associated with this flow type, router 102 buffers and forwards that flow's packets in a manner such that the flow's packets will travel through network 100 at no less than the associated bandwidth—to the extent that router 102 can assist this to happen.

A fourth flow type is the "best effort" flow type. In one embodiment of the invention, flows associated with this flow type are also associated with a "drop priority," which is a value within a specified range (e.g., 1 to 8). According to one embodiment of the invention, when router 102 needs to delay or drop buffered packets in order to guarantee the bandwidth of some other flow, router 102 drops packets from flows associated with the "best effort" flow type before dropping packets from flows associated with other flow types. In one embodiment of the invention, when router 102 has buffered packets from multiple flows associated with the "best effort" flow type, the manner in which router 102 chooses which of those flows' packets to drop is based on the drop priorities associated with those flows.

In one embodiment of the invention, when router 102 needs to drop one or more packets from "best effort" flows, router 102 determines, for each such flow, a percentage value that is based on that flow's drop priority, and selects that percentage of total packets to be dropped from flows that are associated with that drop priority. For example, assuming that router 102 has buffered packets from several "best effort" flows, router 102 may drop relatively few of the packets that need to be dropped from flows that are associated with the lowest drop priority (e.g., "1"), and router 102 may drop relatively many of the packets that need to be dropped from flows that are associated with the highest drop priority (e.g., "8"). For a more specific example, depending on the drop priorities associated with the flows, router 102 might drop 10% of the packets that need to be dropped from a set of flows that have a drop priority of "1," router 102 might drop 30% of the packets that need to be dropped from a set of flows that have a drop priority of "8," and, for each set of flows that has a drop priority between "1" and "8," router 102 might drop some percentage between 10% and 30% of the packets that need to be dropped from that set of flows.

According to one embodiment of the invention, a policy may be associated with an action that causes a bandwidth associated with a flow to be changed. The bandwidth may be expressed in bytes per second, for example. More specifically, an action might cause a minimum guaranteed bandwidth associated with a flow to be increased, decreased, set to a specified value, or removed entirely. Additionally or alternatively, an action might cause a maximum allowed bandwidth associated with a flow to be increased, decreased, set to a specified value, or removed entirely. When a flow is associated with a minimum guaranteed bandwidth, router 102 buffers and forwards that flow's packets in a manner that ensures, as much as possible, that the flow's packets will travel through network 100 no slower than the minimum guaranteed bandwidth. Conversely, when a flow is associated with a maximum allowed bandwidth, router 102 buffers and forwards that flow's packets in a manner than ensures, as much as possible, that the flow's packets will not travel through network 100 any faster than the maximum allowed bandwidth. Router 102 can control a flow's bandwidth by dropping packets from that or other flows.

Aggregate Classes

As is discussed above, an action may be associated with a policy that changes the "aggregate class" to which a flow belongs. In one embodiment of the invention, each flow may be associated with an aggregate class. Each aggregate class may comprise one or more flows that belong to that class. For example, each aggregate class may correspond to a different type of traffic; flows whose behavioral statistics indicate that those flows probably represent P2P type traffic may be associated with a P2P aggregate class, while flows whose behavioral characteristics indicates that those flows probably represent VOW type traffic may be associated with a VOIP aggregate class.

In one embodiment of the invention, each aggregate class is associated with a minimum bandwidth, a maximum bandwidth, or both. In such an embodiment, when an aggregate class comprises more than one flow, router 102 applies that aggregate class' minimum and/or maximum bandwidth constraints to all of the flows in the class as though all of the flows in that class were actually a single flow.

For example, an aggregate class might comprise both a first flow and a second flow. Packets from the first flow might be arriving at router 102 at a rate of 50 Kbps, while packets from the second flow might be arriving at router 102 at a rate of only 5 Kbps. If the aggregate class is associated with a maximum bandwidth of 30 Kbps, then router 102 may drop packets from either or both of the first and second flows (packets from the first flow rather than the second flow are much more likely to be dropped under these circumstances because packets from the first flow arrive at a much higher rate) until the union of all packets associated with the first flow and all packets associated with the second flow are collectively forwarded out of router 102 at a rate no greater than 30 Kbps.

Additionally or alternatively, actions may be applied relative to packets of aggregate classes in the same way that those actions are applied relative to packets of flows. In one embodiment of the invention, aggregate behavioral statistics, derived based on the behavioral statistics of all of the flows associated with an aggregate class, are maintained for that aggregate class. For example, to derive the average packet size for an aggregate class that comprises many separate flows, the average packet sizes of each the flows may be added together and divided by the number of flows in the aggregate class. In such an embodiment, if the aggregate behavioral statistics associated with a packet's aggregate class satisfy a particular policy, then router 102 applies the actions associated with that policy relative to that packet, even if the behavioral statistics associated with that packet's flow, considered in isolation, do not satisfy the particular policy.

Actions may involve changing the aggregate class to which a flow belongs from one existing class to another class. For example, an action may move a flow from a "high priority" aggregate class to a "low priority" aggregate class in order to penalize the type of traffic that the flow represents. Alternatively, an action may move a flow from a "low priority" aggregate class to a "high priority" aggregate class in order to reward the type of traffic that the flow represents; such an action might be appropriate in the cases of flows which represent VOIP or online gaming traffic. A flow does not need to be a part of an aggregate class in order to be added to another aggregate class; flows which belong to no aggregate class whatsoever can be added to an existing aggregate class.

Actions may involve "shaping" traffic that possesses certain specified characteristics. Such shaping may be beneficial especially in the context of flows which represent VOIP or audio/video streaming traffic. "Shaping" traffic means delaying, at the current router, packets that belong to a flow that represents that traffic, and sending those packets out from the current router at a relatively slow, user-provisioned rate as long as those packets are within a burst tolerance defined for that flow, so that the bursty nature of the traffic is "smoothed." Shaping traffic in this manner reduces the buffering requirements of network elements that are "upstream" of the current router.

Sample Operation

The above discussion provides a high level overview of the operation of a FM 210. To facilitate a complete understanding of the invention, a specific sample operation of a FM 210 in accordance with one embodiment of the present invention is described below. In the following discussion, line card 202d of FIG. 2 is assumed to be acting as an egress line card, and line card 202b is assumed to be acting as an ingress line card that is sending packets to egress line card 202d. The following discussion describes the operation of FM 210d on the egress line card 202d.

Initially, FM 210d receives a packet from ingress line card 202b. In processing this packet, FM 210d determines whether the packet belongs to an existing flow. In one embodiment of the invention, FM 210d makes this determination by processing the five tuple contained in the header portion of the packet (e.g., using a hashing function) to derive a flow ID. FM 210d then determines whether this flow ID is associated with a flow block that is already stored (e.g., in a memory, not shown) on the egress line card 202d. If so, then the packet is part of an existing flow. If not, then the packet is the first packet of a new flow.

In this example, the packet is assumed to be the first packet of a new flow. Under these circumstances, FM 210d creates a new flow block for the new flow. A sample flow block 402 in accordance with one embodiment of the present invention is shown in FIG. 4. As shown, the flow block 402 comprises the flow ID (derived by processing the five tuple), and a set of behavioral statistics.

The behavioral statistics include a total (T) byte count (sum of all of the bytes in all of the packets of the flow that have been processed up to the current time), a life duration (L) (how long the flow has been in existence since inception), a flow rate (R) (derived by dividing T by L), a number (N) of the flow's packets processed up to the current time, an average (A) packet size (derived by dividing T by N), an average packet rate (derived by dividing N by L), an average inter-packet gap (derived by averaging the amounts of time that pass between the arrival of packets that belong to the flow), a moving average flow rate (discussed above), and an instantaneous flow rate (derived by dividing (a) the size of the most recently arrived packet of the flow by (b) the inter-arrival time gap between the two most recently arrived packets of that flow), and a timestamp that indicates when flow block 402 was created.

The behavioral statistics may include other sets of information as well. In addition to the above information, the flow block 402 may also include any other information pertinent to the flow, such as a flow type, a drop priority, and/or other QOS data.

In one embodiment of the invention, when flow block 402 is initially created, the timestamp value is updated with the current time. The other behavioral statistics are set to 0. Flow block 402 is then stored on the egress line card 202*d* for future reference.

After creating flow block 402, FM 210*d* determines a set of policies that the behavioral statistics satisfy, if any. FM 210*d* accomplishes this by determining, for each specified policy, whether the behavioral statistics satisfy all of that policy's criteria. After determining the set of satisfied policies, FM 210*d* applies, relative to the packet, all of the actions that are associated with each of the satisfied policies.

Assuming that none of the applied actions prevent the packet from being forwarded (e.g., due to the packet being dropped), FM 210*d* determines (potentially after buffering the packet for some period of time) whether to forward the packet to the router to which egress line card 202*d* is coupled. If the link is currently experiencing congestion, the packet may be dropped. Assuming in this example that the link is not congested, FM 210*d* forwards the packet to the external router. After doing so, FM 210*d* updates the behavioral statistics to reflect the packet that was just forwarded.

FM 210*d* is then ready to process another packet. The next time FM 210*d* receives a packet belonging to the same flow, FM 210*d* will recognize that the packet is part of an existing flow; thus, FM 210*d* will not create a new flow block. Instead, FM 210*d* will access the existing flow bock 402 and use and/or update the information contained therein. FM 210*d* may receive many more packets belonging to the flow and forward and process those packets in the manner described above. Thus, the behavioral statistics are repeatedly updated to give rise to a set of relatively mature statistics for the flow.

In one embodiment of the invention, if the FM 210*d* decides to drop a packet, then egress line card 202*d* does not forward the packet to the external router. Under such circumstances, FM 210*d* updates the behavioral statistics in a slightly different manner than that described above. Specifically, since the packet was not forwarded, the total byte count T, the number of packets N, and the average packet size A do not change; hence, these values will not be updated. However, the life duration L of the flow (derived by taking the difference between the current time and the timestamp) has changed; thus, it will be updated. Since the rate R depends on L, it will also be updated. In this manner, the behavioral statistics may be updated even when a packet is dropped.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for the identification and handling of a single application flow, the flow comprising a plurality of information packets, and the method comprising:

creating a flow block as the first packet of a flow is processed by a router;

said flow block being adapted to store payload-content agnostic behavioral statistics about said flow;

updating said flow block with the flow's payload-content agnostic behavioral statistics as packets belonging to said flow are processed by said router;

said flow being incapable of being identified by header information alone;

heuristically determining whether at least one user-specified policy is satisfied by said payload-content agnostic behavioral statistics stored in said flow block; and upon determination that at least one user-specified policy is satisfied by said payload-content agnostic behavioral statistics, applying, to at least one packet belonging to said flow, at least one user-specified action that is mapped to the at least one user-specified policy that is satisfied by said payload-content agnostic behavioral statistics;

wherein said payload-content agnostic behavioral statistics for said flow are calculated by said router;

wherein said payload-content agnostic behavioral statistics reflect the empirical behavior of said flow;

wherein at least one of said payload-content agnostic behavioral statistics is chosen from the group consisting of: total byte count accumulated for the flow, flow life duration, average rate of flow, average packet size, average packet rate, average inter-packet gap, instantaneous flow rate, and moving average flow rate.

2. The method of claim 1, wherein said flow block is created by utilizing header information from said first packet of said flow.

3. A machine-implemented method for the identification and handling of a single application flow, the flow comprising a plurality of information packets, and the method comprising:

creating a flow block as the first packet of a flow is processed by a router;

said flow block being adapted to store solely payload-content agnostic behavioral statistics about said flow;

updating said flow block with the flow's payload-content agnostic behavioral statistics as packets belonging to said flow are processed by said router;

said flow being incapable of being identified by header information alone;

heuristically determining whether at least one user-specified policy is satisfied by said payload-content agnostic behavioral statistics stored in said flow block; and upon determination that at least one user-specified policy is satisfied by said payload-content agnostic behavioral statistics, applying, to at least one packet belonging to said flow, at least one user-specified action that is mapped to the at least one user-specified policy that is satisfied by said payload-content agnostic behavioral statistics;

wherein said payload-content agnostic behavioral statistics for said flow are calculated by said router;

wherein said payload-content agnostic behavioral statistics reflect the empirical behavior of said flow;

wherein said payload-content agnostic behavioral statistics are chosen from the group consisting of: total byte count accumulated for the flow, flow life duration, average rate of flow, average packet size, average packet rate, average inter-packet gap, instantaneous flow rate, and moving average flow rate.

* * * * *